(12) United States Patent
Bouazizi et al.

(10) Patent No.: US 11,716,370 B2
(45) Date of Patent: *Aug. 1, 2023

(54) METHOD AND APPARATUS FOR ENCAPSULATION OF MOTION PICTURE EXPERTS GROUP MEDIA TRANSPORT ASSETS IN INTERNATIONAL ORGANIZATION FOR STANDARDIZATION BASE MEDIA FILES

(71) Applicant: Samsung Electronics Co., Ltd., Suwon-si (KR)

(72) Inventors: Imed Bouazizi, Plano, TX (US); Youngkwon Lim, Plano, TX (US); Kong Posh Bhat, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/656,767

(22) Filed: Mar. 28, 2022

(65) Prior Publication Data

US 2022/0217193 A1 Jul. 7, 2022

Related U.S. Application Data

(63) Continuation of application No. 14/091,243, filed on Nov. 26, 2013, now Pat. No. 11,290,510.

(60) Provisional application No. 61/731,360, filed on Nov. 29, 2012.

(51) Int. Cl.
*H04L 65/70* (2022.01)
*H04N 21/854* (2011.01)
*H04L 65/612* (2022.01)

(52) U.S. Cl.
CPC .......... *H04L 65/70* (2022.05); *H04L 65/612* (2022.05); *H04N 21/85406* (2013.01)

(58) Field of Classification Search
USPC ...................................................... 709/217
See application file for complete search history.

(56) References Cited

U.S. PATENT DOCUMENTS

| 6,990,202 B2 | 1/2006 | Wee et al. |
| 7,023,924 B1 | 4/2006 | Keller et al. |
| 7,463,735 B2 | 12/2008 | Wee et al. |

(Continued)

FOREIGN PATENT DOCUMENTS

| CN | 101647280 A | 2/2010 |
| CN | 101682718 A | 3/2010 |

(Continued)

OTHER PUBLICATIONS

Notification of Reason for Rejection, dated Jul. 27, 2015, in connection with Japanese Application No. 2015-523032, 8 pages.

(Continued)

*Primary Examiner* — Kevin S Mai (57) ABSTRACT

An apparatus includes receive path circuitry configured to receive a Motion Picture Experts Group (MPEG) Media Transport (MMT) container and a processing device configured to identify locations of one or more media fragment units (MFUs) in the MMT container using a hint track within the MMT container. Another apparatus includes transmit path circuitry configured to transmit an MMT container and a processing device configured to identify locations of one or more MFUs in the MMT container using a hint track within the MMT container.

8 Claims, 5 Drawing Sheets

(56) References Cited

U.S. PATENT DOCUMENTS

| | | |
|---|---|---|
| 2003/0188182 A1 | 10/2003 | Sato et al. |
| 2008/0275905 A1 | 11/2008 | Hannuksela |
| 2009/0083794 A1 | 3/2009 | Lee et al. |
| 2010/0027424 A1 | 2/2010 | Radunovic et al. |
| 2010/0135646 A1 | 6/2010 | Bang et al. |
| 2010/0146018 A1 | 6/2010 | Kim |
| 2010/0153395 A1 | 6/2010 | Hannuksela et al. |
| 2010/0171812 A1 | 7/2010 | Kim et al. |
| 2010/0183033 A1 | 7/2010 | Hannuksela |
| 2010/0189256 A1 | 7/2010 | Doehla et al. |
| 2010/0195832 A1 | 8/2010 | Yan et al. |
| 2010/0250633 A1 | 9/2010 | Hannuksela et al. |
| 2010/0262628 A1 | 10/2010 | Singer |
| 2011/0208829 A1 | 8/2011 | Kwon et al. |
| 2012/0023250 A1 | 1/2012 | Chen et al. |
| 2012/0185607 A1 | 7/2012 | Rhyu et al. |
| 2012/0240174 A1 | 9/2012 | Rhyu et al. |
| 2013/0094563 A1 | 4/2013 | Bae |
| 2013/0094594 A1 | 4/2013 | Bae |
| 2013/0195205 A1 | 8/2013 | Wang et al. |
| 2014/0040612 A1 | 2/2014 | Swaminathan et al. |
| 2015/0201207 A1 | 7/2015 | Yie et al. |

FOREIGN PATENT DOCUMENTS

| | | |
|---|---|---|
| CN | 101711483 A | 5/2010 |
| CN | 102771081 A | 11/2012 |
| JP | H11-88301 A | 3/1999 |
| JP | 2004007533 A | 1/2004 |
| JP | 2008047250 A | 2/2008 |
| JP | 2010531590 A | 9/2010 |
| JP | 2011528868 A | 11/2011 |
| KR | 20120084237 A | 7/2012 |
| KR | 20120100799 A | 9/2012 |
| KR | 20120119790 A | 10/2012 |
| RU | 2009147728 A | 8/2011 |
| RU | 2437244 C2 | 12/2011 |
| WO | 2011132937 A2 | 10/2011 |
| WO | 2012099400 A2 | 7/2012 |
| WO | 2012099429 A2 | 7/2012 |

OTHER PUBLICATIONS

Translated Decision of Grant of Korean Patent Application No. 10-2014-7031080, dated Dec. 16, 2014, 6 pages.

International Search Report dated Mar. 14, 2014 in connection with International Patent Application No. PCT/KR2013/010932, 3 pages.

Written Opinion of International Searching Authority dated Mar. 14, 2014 in connection with International Patent Application No. PCT/KR2013/010932, 8 pages.

Decision of Rejection dated Feb. 2, 2016 in connection with Japanese Patent Application No. 2015-523032, 6 pages.

Foreign Communication from Related Counterpart Application; Chinese Patent Application No. 201380062645.1; First Chinese Office Action dated Jun. 1, 2017; 14 pages.

Extended European Search Report dated Jul. 1, 2016 in connection with European Application No. 13858997.3, 6 pages.

Communication from a foreign patent office in a counterpart foreign application, "Notification of Reason for Rejection," Japanese Application No. 2015-523032, dated Aug. 22, 2017, 6 pages.

Communication from a foreign patent office in a counterpart foreign application, "Official Action and Search Report," Russian Application No. 2015125573, dated Oct. 23, 2017, 13 pages.

MPEG Media Transport ISO/IEC, "Study of ISO/IEC CD 23008-1," JTC1/SC29/WG11, MPEG/N13089, Oct. 2012, URL: http://mpeg.chiariglione.org/sites/defauit/diles/files/standards/parts/docs/213089-v2-w130, 15 pages.

Japan Patent Office, "Notice of Allowance," Application No. JP2018-214479, dated Aug. 20, 2019, 6 pages.

China National Intellectual Property Administration, "The First Office Action" dated Mar. 3, 2021, in connection with Chinese Patent Application No. 201910011920.6, 13 pages.

Park et al., "Working Draft of MPEG Media Transport", ISO/IEC JTC1/SC29/WG11/N12334, Dec. 2011, 14 pages.

Office Action dated Nov. 25, 2020 in connection with Chinese Patent Application No. 201910012226.6, 13 pages.

METHOD AND APPARATUS FOR ENCAPSULATION OF MOTION PICTURE EXPERTS GROUP MEDIA TRANSPORT ASSETS IN INTERNATIONAL ORGANIZATION FOR STANDARDIZATION BASE MEDIA FILES

CROSS-REFERENCE TO RELATED APPLICATIONS AND CLAIM OF PRIORITY

This application is a continuation of U.S. patent application Ser. No. 14/091,243, filed Nov. 26, 2013, which claims priority to U.S. Provisional Patent Application No. 61/731,360, filed Nov. 29, 2012. The above-identified applications are hereby incorporated by reference in their entirety.

TECHNICAL FIELD

This disclosure relates generally to transferring media content. More specifically, this disclosure relates to a method and apparatus for encapsulation of Motion Picture Experts Group (MPEG) Media Transport (MMT) assets in International Organization for Standardization (ISO) Base Media Files.

BACKGROUND

Motion Picture Experts Group (MPEG) Media Transport (MMT) specifies technologies for the delivery of coded media data for multimedia services over heterogeneous Internet Protocol (IP) network environments. The delivered coded media data includes both (i) audio-visual media data of which the data units have an inherent timeline (namely timed data) and (ii) other types of data that do not have an inherent timeline among their data units (namely non-timed data). MMT is designed under the assumption that the coded media data is delivered through a packet-based delivery network using Internet Protocols, such as the Realtime Transport Protocol (RTP), Transmission Control Protocol (TCP), and User Datagram Protocol (UDP).

SUMMARY

This disclosure provides a method and apparatus for encapsulation of Motion Picture Experts Group (MPEG) Media Transport (MMT) assets in International Organization for Standardization (ISO) Base Media Files.

In a first embodiment, an apparatus includes receive path circuitry configured to receive an MMT container. The apparatus also includes a processing device configured to identify locations of one or more media fragment units (MFUs) in the MMT container using a hint track within the MMT container.

In a second embodiment, an apparatus includes transmit path circuitry configured to transmit an MMT container. The apparatus also includes a processing device configured to identify locations of one or more media fragment units (MFUs) in the MMT container using a hint track within the MMT container.

In a third embodiment, a method includes receiving an MMT container. The method also includes identifying locations of one or more media fragment units (MFUs) in the MMT container using a hint track within the MMT container.

In a fourth embodiment, a method includes receiving MFUs of an MMT container, identifying missing MFUs, marking them appropriately or adjusting the metadata for correct processing.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation, and such a device may be implemented in hardware or in a combination of hardware and software/firmware. It should be noted that the functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Definitions for certain words and phrases are provided throughout this patent document, and those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of this disclosure in this patent document are by way of illustration only and should not be construed in any way to limit the scope of the disclosure. Those skilled in the art understand that the principles of this disclosure may be implemented in any suitable device or system.

Figure 1:
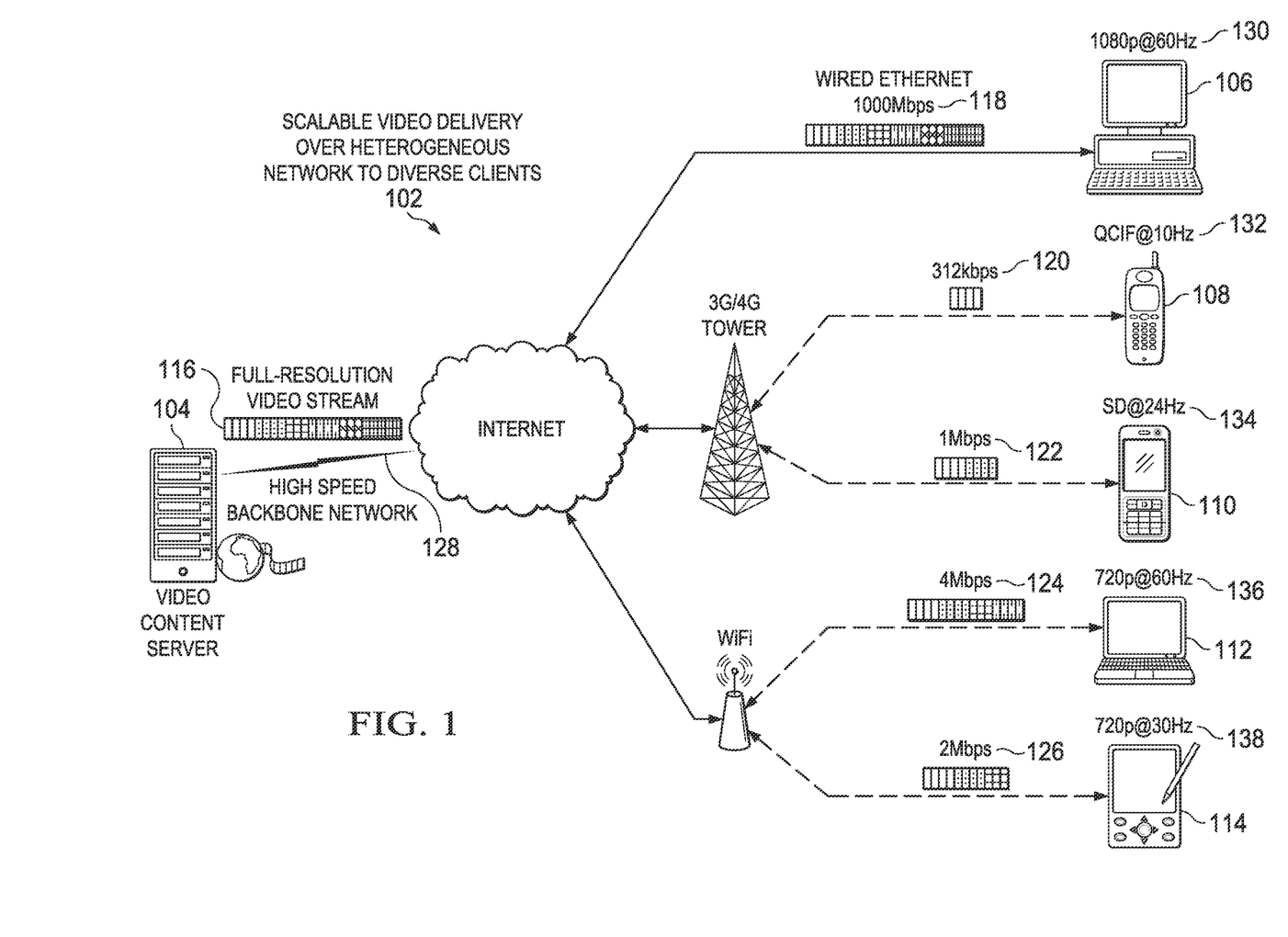
FIG. 1 illustrates example scalable video delivery over a heterogeneous network to diverse clients according to this disclosure.

FIG. 1 illustrates example scalable video delivery over a heterogeneous network to diverse clients according to this disclosure. The embodiment shown in FIG. 1 is for illustration only. Other embodiments could be used without departing from the scope of this disclosure.

Figure 2:
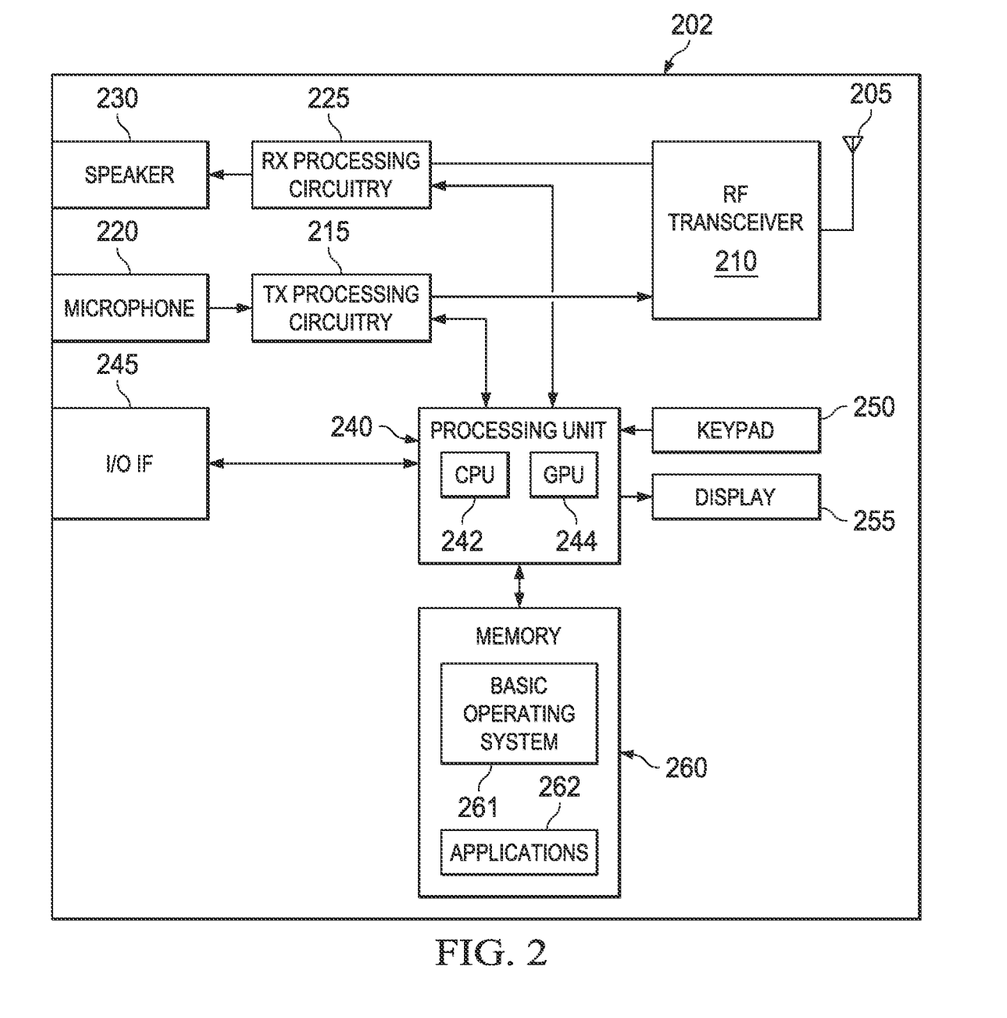
FIG. 2 illustrates an example MMT device according to this disclosure.

A heterogeneous network 102 includes a Motion Picture Experts Group (MPEG) Media Transport (MMT) server 104 that serves media content (such as image, audio, and video content) to MMT clients 106-114. The MMT server 104 and the MMT clients 106-114 represent MMT devices and could be implemented as shown in FIG. 2 or in any other suitable manner. The MMT server 104 can send full-resolution video streams 116 via the heterogeneous network 102 to the MMT clients 106-114. The MMT clients 106-114 receive some or all of the video stream 116 at one or more bit rates 118-126 and one or more resolutions 130-138 based (among other things) on a type of connection to the heterogeneous network 102 and a type of the MMT client. The types and bit rates of connections to the heterogeneous network 102 can include high-speed backbone network connection 128, 1000 megabit per second (Mbps) connection 118, 312 kilobit per second (kbps) connection 120, 1 MBPS connection 122, 4 Mbps connection 124, 2 Mbps connection 126, and so forth. The resolutions 130-138 can include 1080 progressive (1080p) at 60 Hertz (1080p@60 Hz) 130, quarter common intermediate format (QCIF) at 10 Hz 132, standard definition (SD) at 24 Hz 134, 720 progressive (720p) at 60 Hz 136, 720p at 30 Hz 138, and so on. The types of clients 106-114 can include a desktop computer 106, mobile phone 108, personal digital assistant (PDA) 110, laptop 112, and tablet 114.

The media content, also referred to as an MMT asset, is sent via MMT containers from the MMT server 104 to the MMT clients 106-114 via one or more MFUs. The MMT asset can be consumed by the MMT clients 106-114, even when not all of the MFUs are received by the MMT clients 106-114. The MMT container identifies the MFUs that have been received and have not been received so the MMT clients 106-114 can render the MFUs that have been received and not render the MFUs that have not been received.

FIG. 2 illustrates an example MMT device 202 according to this disclosure. The embodiment of the MMT device 202 shown in FIG. 2 is for illustration only. Other embodiments of an MMT device could be used without departing from the scope of this disclosure.

The MMT device 202 includes an antenna 205, a radio frequency (RF) transceiver 210, transmit (TX) processing circuitry 215, a microphone 220, and receive (RX) processing circuitry 225. The MMT device 202 also includes a speaker 230, a processing unit 240, an input/output (I/O) interface (IF) 245, a keypad 250, a display 255, and a memory 260. The MMT device 202 could include any number of each of these components.

The processing unit 240 includes processing circuitry configured to execute instructions, such as instructions stored in the memory 260 or internally within the processing unit 240. The memory 260 includes a basic operating system (OS) program 261 and one or more applications 262. The MMT device 202 could represent any suitable device that uses MMT, such as an MMT client 106-114 or an MMT server 104. In particular embodiments, the MMT device 202 represents a mobile telephone, smartphone, personal digital assistant, or tablet computer. The MMT device 202 sends, receives, or displays media content via MMT.

The RF transceiver 210 receives, from the antenna 205, an incoming RF signal transmitted by a base station or other device in a wireless network. The RF transceiver 210 down-converts the incoming RF signal to produce an intermediate frequency (IF) or baseband signal. The IF or baseband signal is sent to the RX processing circuitry 225, which produces a processed baseband signal (such as by filtering, decoding, and/or digitizing the baseband or IF signal). The RX processing circuitry 225 can provide the processed baseband signal to the speaker 230 (for voice data) or to the processing unit 240 for further processing (such as for web browsing or other data).

The TX processing circuitry 215 receives analog or digital voice data from the microphone 220 or other outgoing baseband data (such as web data, e-mail, or interactive video game data) from the processing unit 240. The TX processing circuitry 215 encodes, multiplexes, and/or digitizes the outgoing baseband data to produce a processed baseband or IF signal. The RF transceiver 210 receives the outgoing processed baseband or IF signal from the TX processing circuitry 215 and up-converts the baseband or IF signal to an RF signal that is transmitted via the antenna 205.

In some embodiments, the processing unit 240 includes a central processing unit (CPU) 242 and a graphics processing unit (GPU) 244 embodied in one or more discrete devices. In some embodiments, the CPU 242 and the GPU 244 are implemented as one or more integrated circuits disposed on one or more printed circuit boards. The memory 260 is coupled to the processing unit 240. In some embodiments, part of the memory 260 represents a random access memory (RAM), and another part of the memory 260 represents a Flash memory acting as a read-only memory (ROM).

In some embodiments, the memory 260 is a computer readable medium that stores program instructions to transfer media content via MMT. When the program instructions are executed by the processing unit 240, the program instructions cause one or more of the processing unit 240, CPU 242, and GPU 244 to execute various functions and programs in accordance with embodiments of this disclosure.

The processing unit 240 executes the basic OS program 261 stored in the memory 260 in order to control the overall operation of the MMT device 202. For example, the processing unit 240 can control the RF transceiver 210, RX processing circuitry 225, and TX processing circuitry 215 in accordance with well-known principles to control the reception of forward channel signals and the transmission of reverse channel signals.

The processing unit 240 is also capable of executing other processes and programs resident in the memory 260, such as operations for identifying MFU locations via a hint track as described in more detail below. The processing unit 240 can also move data into or out of the memory 260 as required by an executing process. In some embodiments, the processing unit 240 is configured to execute a plurality of applications 262. The processing unit 240 can operate the applications 262 based on the OS program 261 or in response to a signal received from a base station. The processing unit 240 is coupled to the I/O interface 245, which provides the MMT device 202 with the ability to connect to other devices, such as laptop computers, handheld computers, and server computers. The I/O interface 245 is the communication path between these accessories and the processing unit 240.

The processing unit 240 is also optionally coupled to the keypad 250 and the display unit 255. An operator of the MMT device 202 uses the keypad 250 to enter data into the MMT device 202. The display 255 may be a liquid crystal display, light emitting diode (LED) display, or other display capable of rendering text and/or at least limited graphics from web sites. Alternate embodiments may use other types of input/output devices and displays.

For efficient and effective delivery of coded media data over heterogeneous Internet Protocol (IP) network environments, MMT provides the following elements:
- a logical model to construct content composed of various components for mash-up applications;
- a structure of data conveying information about the coded media data for delivery-layer processing such as packetization and adaptation;
- a packetization method and a structure of a packet to deliver media content agnostic to the specific type of media or coding method used over TCP or UDP including hybrid delivery;
- a format of signaling messages to manage presentation and delivery of media content;
- a format of signaling messages to manage presentation and delivery of media content; and
- a format of information to be exchanged across layers to facilitate cross-layer communication.

Figure 3:
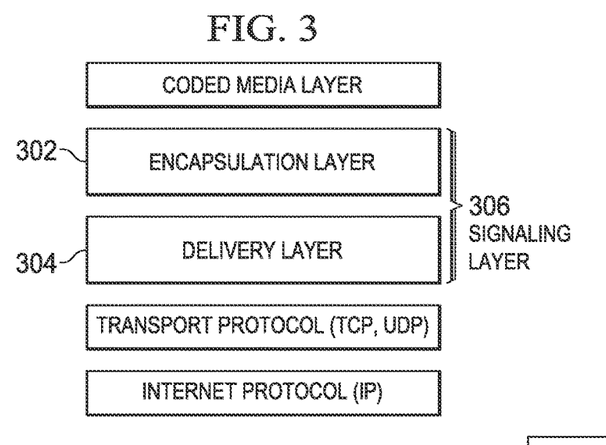
FIG. 3 illustrates example functionalities provided by Motion Picture Experts Group (MPEG) Media Transport (MMT) according to this disclosure.

FIG. 3 illustrates example functionalities provided by MMT according to this disclosure. The embodiment shown in FIG. 3 is for illustration only. Other embodiments could be used without departing from the scope of this disclosure.

Functionalities provided by MMT are categorized into three functional areas, namely an encapsulation layer 302, a delivery layer 304, and a signaling layer 306. The encapsulation layer 302 defines the logical structure of media content, an MMT package, and a format of the data units to be processed by an MMT-compliant entity. An MMT package includes one or more components having media content and descriptions of relationships among the components to provide information to the underlying delivery layer 304 for adaptive operation. The format of the data units is defined to encapsulate the coded media data of the media content to be stored or carried as a payload of a delivery protocol and to be easily converted between different delivery protocols.

The delivery layer 304 defines an application layer protocol and a format of the payload. The application layer protocol provides enhanced features, such as multiplexing, for delivery of coded media data compared to conventional application layer protocols for the delivery of media content (also referred to as "multimedia"). The payload format is defined to carry coded media data independent of the specific media type or encoding method.

The signaling layer 306 defines the format of messages to manage delivery and consumption of MMT packages. Messages for consumption management are used to signal the structure of an MMT package. Messages for delivery management are used to signal the structure of a payload format and a configuration of the protocol.

The encapsulation layer 302 defines a logical structure and instantiation of an MMT package within an International Organization for Standardization (ISO) Base Media File Format (ISOBMFF) for distributed storage and adaptive delivery by a network entity. Here, an MMT package defines a logical entity aggregating coded media data of the media content (namely MMT assets) and the information for delivery layer processing. An MMT asset defines the logical structure carrying the coded media data. MMT assets can collectively reference a number of Media Processing Units (MPUs) with the same MMT asset identification (ID).

Any type of data that can be individually consumed by an entity directly connected to an MMT client is a separate MMT asset. This includes not only coded media data decodable by a single media codec but also other types of data that have already been multiplexed. MPUs provide information about the media data for adaptive packetization according to the constraints of the underlying delivery layer's packet size, such as the boundaries and sizes of small fragments of the data carried in the MPU. Such small fragments are known as Media Fragment Units (MFUs). This enables the underlying delivery layer entity to dynamically packetize the MPUs adaptively based on the size of the maximum transmission unit of the delivery layer 304. MFUs carry small fragments of coded media data for which such fragments can be independently decoded or discarded, such as a Network Abstraction Layer (NAL) Unit of an Advanced Video Coding (AVC) bitstream.

An MMT encapsulation format instantiated with ISOBMFF includes several features to correctly capture the logical structure of an MMT package and to achieve the MMT goals and benefits, which include:
- backwards-compatibility in that MMT encapsulation reuses the ISOBMFF as much as possible and an ISOBMFF parses and accesses/extracts media data from a file storing an MMT package;
- error robustness to correctly recover an initial structure even in the case of missing MFUs;
- external addressing to efficiently locate and address MPUs independently by upper layers and the delivery entity without a specific location of the MPUs;
- support for a unified structure for timed data and non-timed data storage and delivery;
- ease of access to MPUs and MFUs to easily extract MPU metadata and MFUs for adaptive packetized delivery and to enable easy conversion between storage formats and delivery formats, ideally with the storage format equal to the delivery format;
- support for encapsulation of legacy data formats, such as MPEG-2 transport stream (TS); and
- low redundancy.

Previous MMT designs have several known issues, including:
- the presence of an MFU "box" for each MFU in the stream, which results in a large amount of MFU boxes and very high overhead (such as an MFU box size of 100 bytes and a NAL size of 1000 bytes, resulting in a 10% overhead);
- the MFU box references the media data therein, limiting flexibility on how to packetize the media content via the delivery layer;
- the storage format is different from the delivery format, and the delivery format is not clearly defined; and
- non-timed media data is stored in a manner that is not backwards-compatible.

In addition, IOSBMFF does not provide various features of MMT, including:
- independently addressing or consuming movie fragments;
- correctly parsing and consuming a movie fragment if there are missing parts or packets during packetized delivery; and
- general usage of hint tracks to support packetization that is adaptive to a size of a maximum transmission unit (MTU) of an underlying delivery network.

Embodiments of this disclosure encapsulate MMT content within an ISOBMFF by defining a hint track for an MFU structure. Each MFU is described in a hint sample of the hint track of the MMT. The hint sample of the MMT hint track corresponds to an MFU header that is used to deliver an MFU. The MMT hint sample carries information about the location of the corresponding media data. An MMT device uses this information, together with an MFU sequence number, an MPU sequence number, and the asset identifier, to recover the initial MMT asset structure while correctly identifying the MFUs missing from delivery.

Figure 4:
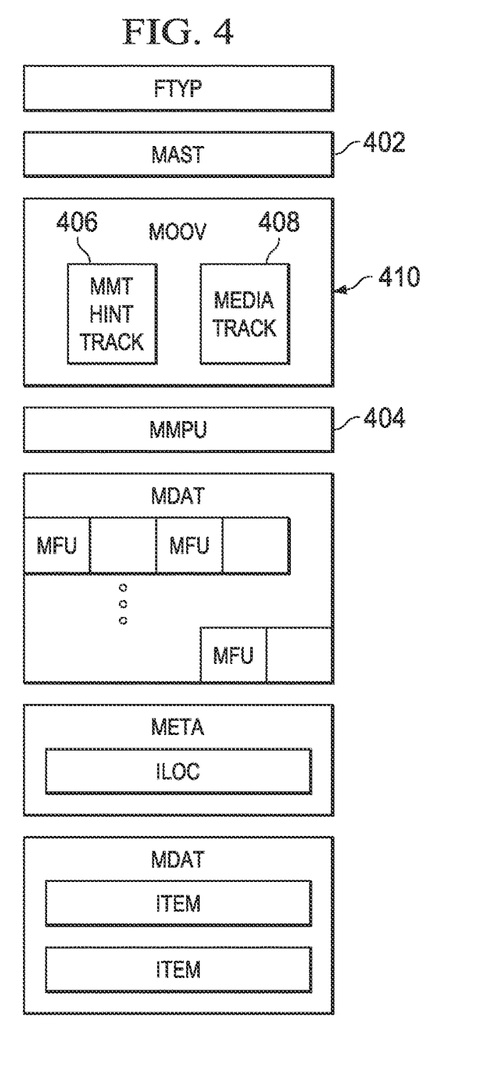
FIG. 4 illustrates an example MMT encapsulation according to this disclosure.

In some embodiments, MMT hint samples are equivalent to MMT Fragmentation Unit headers as illustrated and discussed in relation to FIG. 4. Some embodiments can also have the MMT hint track samples and the MMT media track samples interleaved on a per sample basis, such as when each MFU is one sample and each chunk includes one sample in both a hint track and a media track, as illustrated and discussed in relation to FIGS. 5 and 6.

FIG. 4 illustrates an example MMT encapsulation according to this disclosure. The embodiment shown in FIG. 4 is for illustration only. Other embodiments could be used without departing from the scope of this disclosure.

As shown in FIG. 4, an MMT asset (mast) 402 and an MPU box (mmpu) 404 are delimited by separate boxes. These boxes facilitate external addressability. The storage format shown here is different from the delivery format, and an MMT server uses an MMT hint track 406 to convert the storage format to the delivery format during a packetization operation. The MMT server stores timed media as a track of the ISOBMFF, which contains a single media track 408. The MMT server stores non-timed media as part of the metadata in an ISOBMFF.

The media track 408 of the ISOBMFF is indexed via a "moov" box 410 in a fully backwards-compatible manner. The MPU box 404 ends at the end of a file or before the start of a subsequent MPU to implicitly indicate the boundaries of an MPU and to allow for more flexibility in editing, recording, and incremental generation of live content. In some embodiments, the media track 408 of the ISOBMFF is indexed by a "moof" box (such as a moof box 502 in FIG. 5).

The MMT hint track 406 guides the delivery layer entity, such as an MMT server 104 or MMT clients 106-114, in converting a stored MMT asset 402 into a packetized media stream. The packetized media stream is delivered by an MMT server to an MMT client using the MMT protocol (MMTP) as the delivery protocol.

The MMT hint track 408 provides to the entity generating the delivery packets, such as an MMT server 104, location information of the MFUs of an MPU for adaptive packetization and delivery decisions. The packetization and delivery decisions include statistical multiplexing and dropping of some MFUs to cope with instantaneous network congestion. Media data of an MMT asset within an MMT container are extracted, together with MMT hint samples, to generate MMT packets. One or more MFUs may then be used to build a single MMTP packet. Consequently, the storage formats are not exactly same as the delivery format, which requires an active network entity that is able to extract and encapsulate media data on the fly to build MMTP packets. The media data may be stored in such a way that an ISOBMFF-compliant entity can parse the media data.

The MMT hint track 406 provides information about the MFUs to the network entities for generation of MMT packets. If further fragmentation of an MPU for delivery is not required, the hint track 406 may be omitted completely.

In some embodiments, MMT hint tracks (such as hint track 406) are hint tracks with an entry format in the sample description of "mmth" and can be defined, for example, as:

```
aligned(8) class MMTHintSampleEntry( ) extends SampleEntry('mmtp') {
    unsigned int(16) hinttrackversion = 1;
    unsigned int(16) highestcompatibleversion = 1;
    unsigned int(1) has_mfus_flag;
    unsigned int(1) is_timed;
    unsigned int(6) reserved;
    MMTAsset asset;
}
```

The sample description format shown above is for illustration only. Other embodiments could be used without departing from the scope of this disclosure. The semantics of the above sample description format include:
  has_mfus_flag indicates whether the MPUs provide information about MFUs, whether the hint track provides complete MPUs so that each MFU identified by the hint track can have a single sample when the MPUs do not provide information about MFUs, and whether each hint sample refers to an MFU when the MPUs provide information about MFUs; and
  is_timed: indicates whether the media hinted by this track is timed or is not timed.

Each media sample is assigned to one or more MFUs. Each sample of the MMT hint track can generate one or more MFUs that can use the following syntax:

```
aligned(8) class MMTHSample {
    unsigned int(32) sequence_number;
    if (is_timed) {
        signed int(8) trackrefindex;
        unsigned int(32) samplenumber;
        unsigned int(16) offset;
        unsigned int(32) length;
    } else {
        unsigned int(16) item_ID;
    }
    unsigned int(1) mfu_lost_flag;
    Unsigned int(7) reserved;
}
```

The sample format shown above is for illustration only. Other embodiments could be used without departing from the scope of this disclosure. The syntax of the above sample format includes:
  sequence_number is a sequence number assigned to this MFU;
  trackrefindex is an identification of the media track from which the MFU data is extracted;
  samplenumber is a sequence number assigned to the sample from which this MFU is extracted;
  item_ID refers to the item that builds this MFU for non-timed media data;
  offset gives the offset of the media data, and the offset base is the beginning of an "mdat" box containing the sample;
  length gives the length of the MFU in bytes; and
  mfu_lost_flag indicates whether the MFU has been lost, such as whether the corresponding media data is missing or not.

Figure 5:
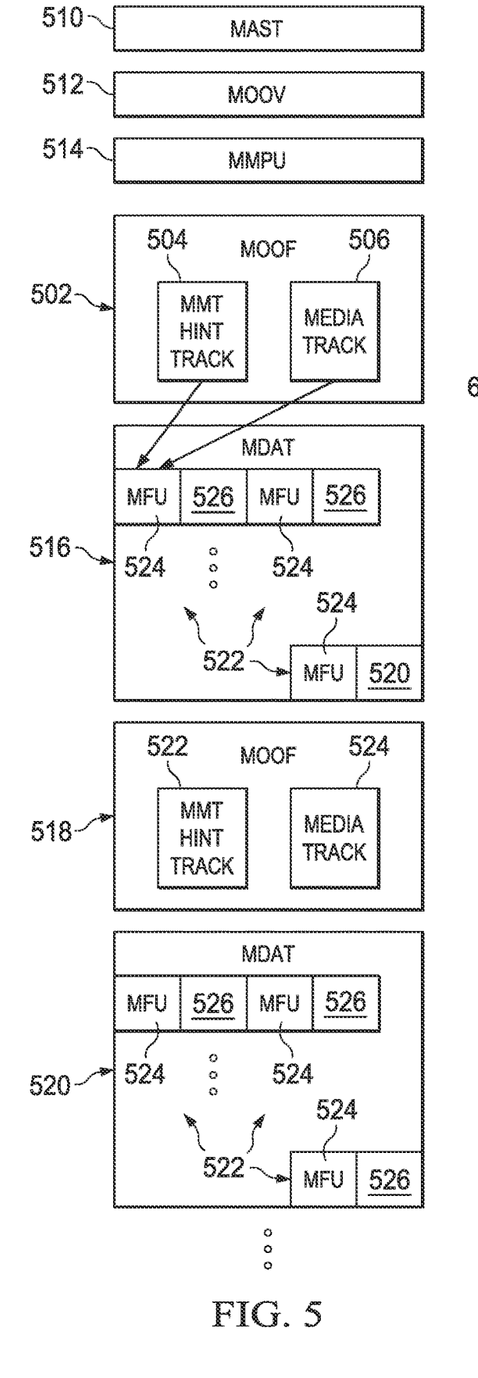
FIG. 5 illustrates an example MMT encapsulation with a sample level hint track and a sample level media track of timed media according to this disclosure.

FIG. 5 illustrates an example MMT encapsulation with a sample level hint track and a sample level media track of timed media according to this disclosure. The embodiment shown in FIG. 5 is for illustration only. Other embodiments could be used without departing from the scope of this disclosure.

In sample-based interleaving for sample delivery, the delivery format corresponds to the MMT payload format and includes the MFU header and the MFU media data. The MFU header is a copy of the hint sample, which facilitates the creation of the MMTP payload and packets.

In FIG. 5, a hint track 504 and a media track 506 are interleaved at a sample level inside of a "moof" box 502 of an MMT container 508. This results in one sample per chunk and a straightforward packetization process. The MMT container 508 also includes a "mast" box 510, a "moov" box 512, an "mmpu" box 514, "moof" boxes 502 and 518, and "mdat" boxes 516 and 520. The moof boxes 502 and 518 include MMT hint tracks 504 and 522 and media tracks 506 and 524. The mdat boxes 516 and 520 include one or more MFUs 522. The MFUs 522 include MFU headers 524 and payloads 526. Each MFU header 524 includes an MFU sequence number and optionally includes an mfu_lost_flag.

Figure 6:
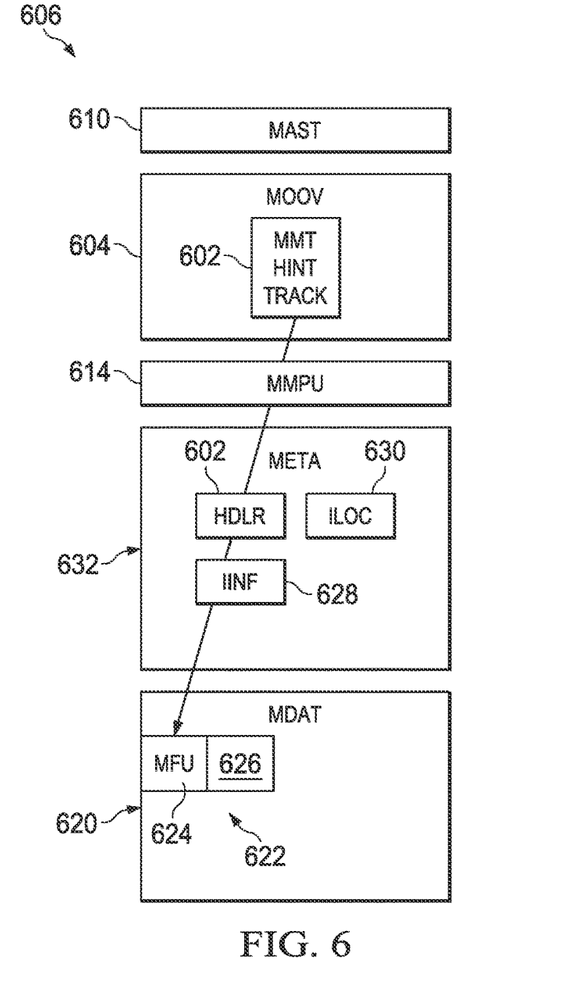
FIG. 6 illustrates an example MMT encapsulation of media that does not include timed media according to this disclosure.

FIG. 6 illustrates an example MMT encapsulation of media that does not include timed media according to this disclosure. The embodiment shown in FIG. 6 is for illustration only. Other embodiments could be used without departing from the scope of this disclosure.

In FIG. 6, a hint track 602 is inside of a "moov" box 604 of an MMT container 606. The MMT container 606 includes a "mast" box 610, the "moov" box 604, an "mmpu" box 614, a "meta" box 632, and an "mdat" box 620. The moov box 604 includes the MMT hint track 602. The meta box 632 includes an "hdlr" box 602, an "iloc" box 630, and an "iinf" box 628. The mdat box 620 includes one or more MFU 622, each of which includes an MFU header 624 and a payload 626.

Figure 7:
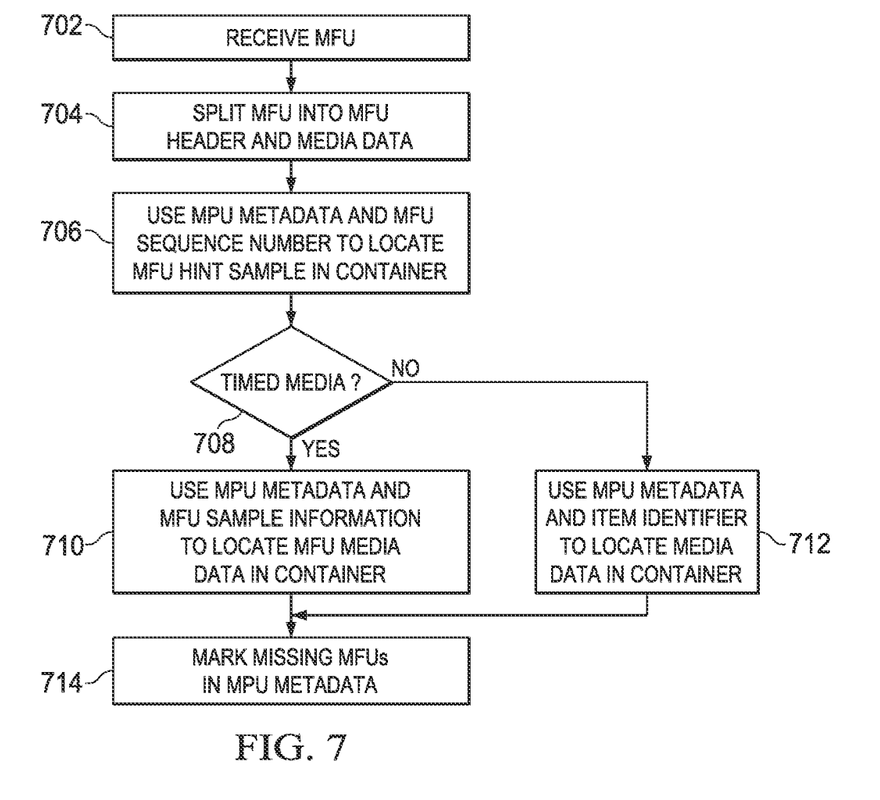
FIG. 7 illustrates an example method for receiving Media Fragment Units (MFUs) according to this disclosure.

FIG. 7 illustrates an example method for receiving MFUs according to this disclosure. The process depicted in FIG. 7 can be implemented in any suitable manner, such as by the processing circuitry in an MMT server 104, MMT client 106-114, or other device.

In block 702, an MMT device, such as an MMT server 104 or client 106-114, receives an MFU of an MMT container. The MFU is one of one or more MFUs used to transfer media content contained in the MMT container. In block 704, the MMT device splits the MFU into an MFU header and an MFU media data. In block 706, the MMT device uses MPU metadata and an MFU sequence number from the MFU header to locate an MFU hint sample in the MMT container. In some embodiments, the MMT device parses the MFU header, which corresponds to the MFU hint sample.

In block 708, the MMT device determines if the media content of the MMT container includes timed media. If the media content includes timed media, the process continues to block 710. If the media content does not include timed media, the process continues to block 712. In block 710, the MMT device uses MPU metadata and MFU sample information to locate MFU media data from the received MFU in the MMT container. The process then continues to block 714. In block 712, the MMT device uses MPU metadata and an item identifier to locate media data in the MMT container. The process then continues to block 714.

In block 714, the MMT device marks missing MFUs in MPU metadata in the MMT container. In some embodiments, missing MFUs are marked via the use of an mfu_lost_flag value for each MFU within an "mdat" box of the MMT container.

If the MMT asset includes timed media, the MMT device places the MMT hint sample in a correct position within the MMT container during processing. The placement is based on the MFU sequence number, which translates into the sample number in the hint sample. The MMT device also uses the sample and the offset information in the MFU header, together with the sample tables of the media track (such as "stco," "stsz," and "stsc" tables or a "trun" table) to locate the position of the media data in the MMT container. If there are any missing MFUs during the delivery, the corresponding area in the MMT container remains empty. In doing so, the MMT device can safely locate the data for MFUs that are correctly received and skip MFUs that are missing from the delivery.

Although various features have been shown in the figures and described above, various changes may be made to the figures. For example, the size, shape, arrangement, and layout of components shown in the figures are for illustration only. Each component could have any suitable size, shape, and dimensions, and multiple components could have any suitable arrangement and layout. Also, various components in the figures could be combined, further subdivided, or omitted and additional components could be added according to particular needs. Further, each component in a device or system could be implemented using any suitable structure(s) for performing the described function(s). In addition, while FIG. 7 illustrates various series of steps, various steps in FIG. 7 could overlap, occur in parallel, occur multiple times, or occur in a different order.

While this disclosure has described certain embodiments and generally associated methods, alterations and permutations of these embodiments and methods are apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of an MPEG media transport (MMT) receiving entity for receiving media content in a multimedia system, the method comprising:
   receiving a packet including a payload; and
   identifying the payload,
   wherein the payload includes media data of a first media fragment unit (MFU) of at least one MFU, and an indicator indicating whether the media data is either timed media data or non-timed media data,
   wherein the at least one MFU is fragmented from a media processing unit (MPU),
   wherein the MPU comprises a MMT hint track providing information related to the fragmentation of the MPU into the at least one MFU and the MMT hint track is associated with at least one hint sample for the at least one MFU,
   wherein the first MFU of the at least one MFU comprises a MFU header and the media data, the MFU header being a copy of a first hint sample of the MMT hint track for the first MFU and the first hint sample including information related to the media data of the first MFU,
   wherein:
      in case that the indicator is set to a first value indicating that the media data is the timed media data, the payload further includes sample number information indicating a sample number of a sample to which the timed media data belongs and offset information for identifying a position of the timed media data in the sample, and
      in case that the indicator is set to a second value indicating that the media data is the non-timed media data, the payload further includes item identification information indicating an identifier of an item of the non-timed media data, wherein the first hint sample comprises sequence number information of the first MFU, wherein the first hint sample further comprises the sample number information and the offset information, in case that the media data is the timed media data, and wherein the first hint sample further comprises the item identification information, in case that the media data is the non-timed media data.

2. The method of claim 1, wherein the payload further includes information indicating a length corresponding to the respective MFU in a unit of a byte.

3. The method of claim 1, wherein the MPU is a unit in which a video or audio signal is processed, and a unit in which a video signal or audio signal is independently decoded from another MPU.

4. The method of claim 1, wherein the offset information indicates a start position of the media data in the sample.

5. A method for transmitting media content by an MPEG media transport (MMT) sending entity in a multimedia system, the method comprising:

identifying at least one media fragment unit (MFU) fragmented from a media processing unit (MPU), wherein the MPU comprises a MMT hint track providing information related to the fragmentation of the MPU into the at least one MFU and the MMT hint track is associated with at least one hint sample for the at least one MFU, wherein a first MFU of the at least one MFU comprises a MFU header and media data, the MFU header being a copy of a first hint sample of the MMT hint track for the first MFU and the first hint sample including information related to the media data of the first MFU;

configuring a payload, the payload including the media data of the first MFU and an indicator indicating whether the media data is either timed media data or non-timed media data; and transmitting a packet including the configured payload to a receiving entity, wherein:

in case that the indicator is set to a first value indicating that the media data is the timed media data, the payload further includes sample number information indicating a sample number of a sample to which the timed media data belongs and offset information for identifying a position of the timed media data of the MFU in the sample, and in case that the indicator is set to a second value indicating that the media data is the non-timed media data, the payload further includes item identification information indicating an identifier of an item of the non-timed media data, wherein the first hint sample comprises sequence number information of the first MFU, wherein the first hint sample further comprises the sample number information and the offset information, in case that the media data is the timed media data, and wherein the first hint sample further comprises the item identification information, in case that the media data is the non-timed media data.

6. The method of claim 5, wherein the payload further includes information indicating a length corresponding to the MFU in a unit of a byte.

7. The method of claim 5, wherein the MPU is a unit in which a video or audio signal is processed, and a unit in which a video signal or audio signal is independently decoded from another MPU.

8. The method of claim 5, wherein the offset information indicates a start position of the media data in the sample.

* * * * *